March 24, 1953     D. F. ALEXANDER     2,632,794
APPARATUS FOR MEASURING VOLTAGE DROP
Filed Oct. 29, 1949

INVENTOR.
Donald F Alexander
BY
Spencer Hardman and Fehr
Attorneys

Patented Mar. 24, 1953

2,632,794

UNITED STATES PATENT OFFICE 2,632,794

APPARATUS FOR MEASURING VOLTAGE DROP

Donald F. Alexander, Oakwood, Ohio, assignor to General Motors Corporation, Dayton, Ohio, a corporation of Delaware Application October 29, 1949, Serial No. 124,435

9 Claims. (Cl. 175—183)

This invention relates to electrical apparatus and more particularly to apparatus for testing the load carrying characteristics of an electrical alternating current power supply.

The increasing application of motorized loads on 115 volt alternating current systems demands a close scrutiny of both the nominal and the starting voltages available for the connection of any particular motor to any particular supply source. In particular, the effective series impedance in the line from the generator to the load must be reasonably low if adequate voltages are to be maintained when the heavy load of starting a motor is applied. Excessive impedance may be in the power supply to the user's meter or in the branch circuits in the premises.

It is an object of my invention to provide a simple apparatus for determining which receptacles and which points of connection with the power supply are capable of sustaining the load applied by any particular electrical appliance within the permissible limits of a voltage drop.

It is another object of my invention to provide a simple apparatus for determining the voltage at any point of connection both with a load and without a load.

It is another object of my invention to provide a simple apparatus for measuring the voltage drop under load of a power supply connection by a simple scalar measurement.

It is another object of my invention to provide a simple apparatus for determining the best place of connection to the power supply for any particular electrical load.

It is another object of my invention to provide a simple apparatus for determining the voltage drop within the residence circuit and the voltage drop due to conditions in the power supply to fix the responsibility for poor voltage regulation.

To attain these objects I have provided in the first form of my invention a simple testing apparatus including a transformer having its primary winding connected across the points of connection and its secondary winding connected to a potentiometer and one side of the line in such a way that it will boost the voltage when connected through a voltmeter to the other side of the line. A switching arrangement is provided so that the voltmeter can either be connected alone across the supply connection or in series with the potentiometer but in parallel with an electrical test load across the supply connectors. In this second switching position, the potentiometer is so adjusted to bring the voltage with the test load connected to the same value as the no load voltage reading. The potentiometer is provided with a scale by which the amount of its adjustment to provide the added voltage may be determined, so that it will give a direct indication of the drop in voltage due to the imposition of the test load or an indication of the quality factor.

In the second form of the invention a scale indication is provided through the use of a means of changing the voltage relationship without the use of a voltage boosting transformer. This is accomplished by the use of a variable resistance which is connected in series with potential indicator. The variable resistance is arranged so that a fixed resistance is connected in series with the potential indicator under no load conditions, and a reduced variable resistance is connected in series with the potential indicator under the loaded condition to achieve an indication through the use of an adjustable tap and a scale.

The third form of the invention is similar to the first form except that the two coil transformer and adjustable potentiometer arrangement therein is replaced by an adjustable step up autotransformer.

This application is a continuation in part of my now abandoned copending application Serial No. 606,339 filed July 21, 1945.

Further objects and advantages of the present invention will be apparent from the following description, reference being had to the accompanying drawing, wherein a preferred form of the present invention is clearly shown.

Figure 1:
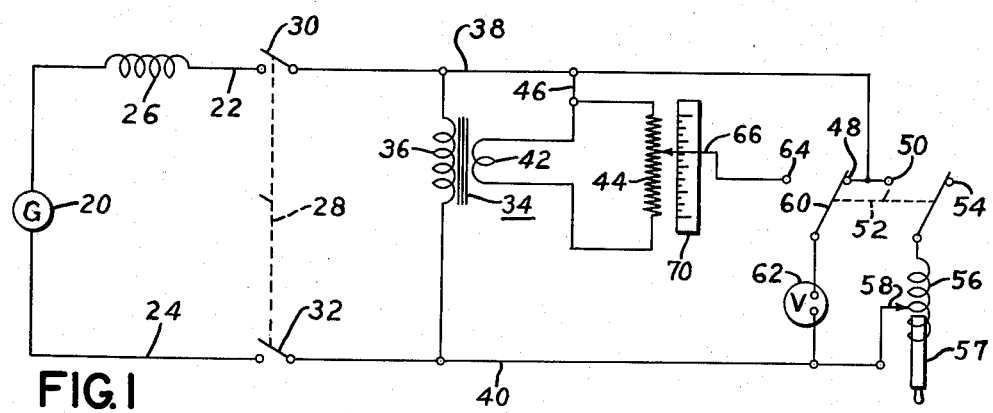
Figure 1 is a wiring diagram of one form of a testing apparatus embodying my invention connected to a source of alternating current.

Referring now to the drawing, there is shown in Figure 1 a generator 20 with supply conductors 22 and 24 having a certain amount of impedance which is represented as the impedance 26. To determine the load carrying characteristic of any particular source of supply I have provided a connecting means 28 providing the connections 30 and 32 with the supply conductors 22 and 24. This connecting means may be in the form of an ordinary receptacle plug or a pair of bare wire ends or switch, or any other convenient form. A transformer 34, such as an ordinary 10 to 1 bell ringing transformer, has its primary winding 36 connected across the conductors 38 and 40 which connect directly to the connections 30 and 32.

The secondary winding 42 of the transformer is connected to the opposite ends of an adjustable potentiometer 44 in a loop circuit arrangement. This loop circuit is connected by the conductor 46 with the conductor 38 in such a way that the secondary winding 42 has its polarity arranged so that it will boost the voltage supplied at the point of connection. The supply conductor 38 connects to the contacts 48 and 50 of the double pole double throw switch means 52. One switch leg 54 of the switch means 52 connects to a variable test impedance 56 having an adjustable tap 58 and an adjustable core 57 which may be adjusted to the resistance and reactance of the load which is intended to be connected to the power source. This adjustable impedance is made removable so that any desired load or impedance may be substituted. The tap 58 of the adjustable impedance is connected to the conductor 40.

The other switch leg 60 of the double throw switch 52 is connected to a voltmeter 62 which in turn is connected to the conductor 40. The remaining live contact 64 of the switch 52 is connected to the tap 66 of the adjustable potentiometer 44. A scale 70 is provided for reading the adjusted position of the tap 66 of the potentiometer 44.

To use the testing apparatus, the connecting means 28 is inserted or connected to any power connection to which it is desired to connect any power appliance. The switch 52 is then thrown to the position shown in the figure wherein the voltmeter 62 is connected directly across the supply connections 30 and 32 to give a voltage reading with the test load disconnected. The tap 58 and the core 57 may be adjusted to simulate the impedance of the motor under maximum load condition of the electrical device desired to be connected to the power supply. For electric motors this will ordinarily be the initial starting condition of the motor. At this time the reactance is low and the load is largely of pure resistance load and the impedance 56 may simulate this load. The switch means 52 is then operated to move the switch blade 54 into contact with the live contact 50 and the switch blade 60 into contact with the contact 64. The tap 66 is then adjusted until the voltmeter 62 reaches the same value as it did under the no load condition. The position of the tap 66 with reference to the scale 70 indicates the amount of additional voltage which was supplied by the secondary winding 42 in order to make up for the drop in voltage caused by the application of the test load.

When the impedance 56 is made to correspond to the load to be applied, the position of the tap 66 with reference to the scale 70 will predict the exact voltage drop when the appliance is connected to the supply circuit. The load carrying characteristic of supply circuits may be compared by employing as the impedance 56 a single fixed test impedance which may for example have a value of 20 ohms for 115 volt circuits. When thus using a single fixed test impedance, the position of the tap 66 relative to the scale 70 will directly indicate the relative load carrying characteristic of the supply circuit. The scale 70 is a linear scale and is preferably arbitrarily calibrated to indicate the value of $$\frac{\text{Voltage no load} - \text{Voltage under test load}}{\text{Current under test load}}$$

This is a fixed characteristic and may be called the "Q" or quality factor of the supply circuit. However, this scale may be marked in any other desired values or units to indicate the relative load carrying characteristics of supply circuits.

If a manufacturer intends that my testing device be used to determine where his appliances may be connected, it is necessary for him to supply the tester with certain information. He must determine the maximum quality factor values necessary for each appliance at each no load voltage within the area of satisfactory operation. The serviceman who is to install the appliance will then determine the no test load voltage and the quality factor value as indicated by the scale 70 for the electrical outlet to which the appliance is to be connected. If the quality factor value determined by the serviceman is less than the maximum value specified by the manufacturer, then it is permissable for him to connect the appliance to that outlet. If the quality factor value as read is more than the maximum quality factor value specified, then it is not permissable for the serviceman to connect the appliance to that outlet and another outlet must be provided for the appliance.

Such an apparatus can be made very light and simple so that it can be used by any serviceman much more conveniently than trying out each receptacle with the actual load to be installed. For other line voltages, instead of using the adjustable impedance 56, there may be substituted different fixed test impedances or any one of a number of different test impedances having characteristics simulating the loads of various electrical appliances to be connected. The scale 70 is preferably marked to indicate the maximum permissible quality factor or the limit of permissable voltage drop so that if the position of the tap 66 upon the completion of the test is beyond the limit, the serviceman will know that the appliance should not be connected to that power outlet. Although this method and apparatus appears to have the greatest application in the residential field, it may be used for all voltages and circuits A. C.

It is another object of my invention to provide a simple apparatus which by simple manipulation will indicate the load carrying characteristic of a power supply connection by a simple scalar indication.

Figure 2:
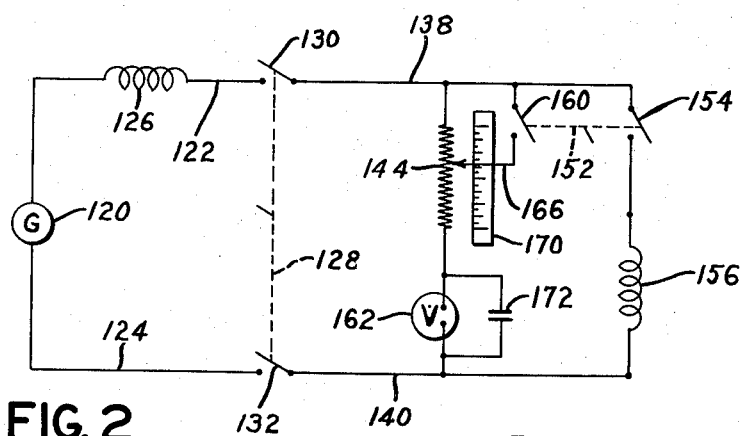
Figure 2 is a wiring diagram of a testing apparatus embodying a modified form of my invention connected to a source of either alternating or direct current.

In Figure 2 there is shown a generator 120 with supply conductors 122 and 124 having a certain amount of impedance which is represented as the impedance 126. To determine the load carrying ability of the supply circuit I have provided a connecting means 128 providing the connections 130 and 132 with the supply conductors 122 and 124. This connecting means may be in the form of an ordinary receptacle plug on a pair of bare wire ends on switch or any other convenient form.

A potential indicator or voltmeter 162 is connected in series with the adjustable resistance 144 across the conductors 138 and 140 which connect directly to the connections 130 and 132. The voltmeter 162 may be provided with capacitor means 172 connected in shunt with it to keep substantially at unity the power factor of this circuit portion. The adjustable resistance 144 is provided with an adjustable tap 166 connected by the switch 160 to the conductor 138. There is also provided a second switch 154 which is connected in series with an impedance 156 which may for example have a value of 20 ohms for a 115 volt circuit for applying a test load upon the power supply. The switches 160 and 154 may be connected together to provide a double pole switch 152 so that they may be simultaneously opened and closed.

In the use of this aparatus the apparatus is connected to the power supply by making the connections 130 and 132. The voltmeter 162 is then read with the switches 154 and 160 in the open position. Thereafter, the switches 154 and 160 are closed and the tap 166 is adjusted to a position in which the voltmeter will read the same amount as it did with the switches 154 and 160 in the open circuit position. The location of the tap 166 with reference to the scale 170 will give an indication of the ability of the supply line to carry an added load. The apparatus shown in Figure 2, since it contains no transformer, may be used upon a direct current power supply as well as an alternating current power supply.

Figure 3:
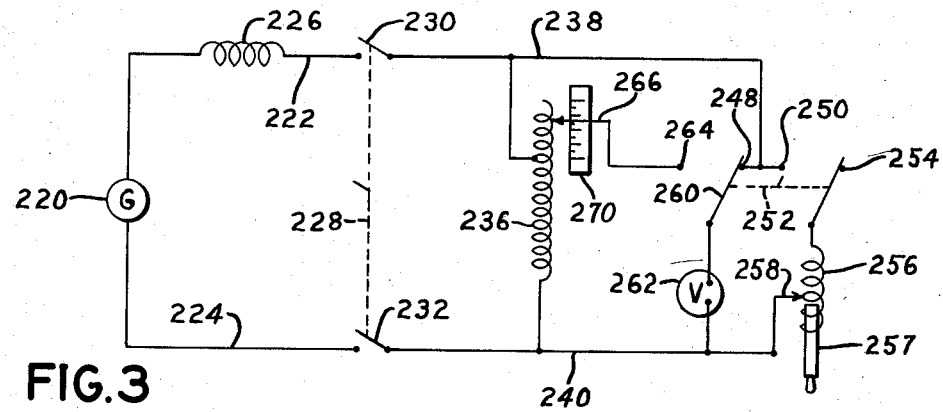
Figure 3 is a wiring diagram of a testing apparatus embodying another modified form of my invention connected to a source of alternating current.

In Figure 3 there is shown an alternating current generator 220 with supply conductors 222 and 224 having a certain amount of impedance which is represented as the impedance 226. To determine the load carrying characteristic of any particular source of supply, I have provided a connecting means 228 providing the connections 230 and 232 with the supply conductors 222 and 224. This connecting means may be in the form of an ordinary receptacle block or a pair of bare wire ends or a switch or any other convenient form. An adjustable boosting autotransformer 236 has its fixed terminals connected across the conductors 238 and 240 which connect directly to the connections 230 and 232. The auto-tranformer 236 at its upper end is provided with an adjustable tap 266 providing a means for obtaining various voltages higher than the voltage existing across the connections 230 and 232.

The supply conductor 238 connects to the contacts 248 and 250 of the double pole, double throw, switch means 252. One switch leg 254 of the switch means 252 connects to a variable test impedance 256 having an adjustable tap 258 and an adjustable core 257 which may be adjusted to the resistance and reactance of the load which is intended to be connected to the power source. This adjustable impedance is made removable so that any desired load or impedance may be substituted. The tap 258 of the adjustable impedance is connected to the conductor 240.

The other switch leg 260 of the double throw switch 252 is connected to a voltmeter 262 which in turn is connected to the conductor 240. The remaining live contact 264 of the switch 252 is connected to the tap 266 of the adjustable booster auto-transformer 236. A scale 270 is provided for reading the adjusted position of the tap 266 of the auto-transformer 236.

To use this testing apparatus, the connecting means 228 is inserted or connected to any power connection to which it is desired to connect any power appliance. The switch 252 is then thrown to the position shown in the figure wherein the voltmeter 262 is connected directly across the supply connections 230 and 232 to give a no test load voltage reading. The tap 258 and the core 257 may be adjusted to simulate the impedance of the motor under maximum load condition of the electrical device desired to be connected to the power supply. For electric motors this will ordinarily be the initial other condition of the motor. At this time the reactance is low and the load is largely a pure resistance load and the impedance 56 may simulate such a load. The switch means 252 is then operated to move the switch blade 254 into contact with the live contact 250 and the switch blade 260 into contact with the contact 264. The tap 266 is then adjusted until the voltmeter 262 reaches the same value as it would under the no load condition. The position of the tap 266 with reference to the scale 270 indicates the amount of additional voltage which was supplied by the auto-transformer 236 in order to make up for the drop in voltage caused by the application of the test load.

However, I prefer to employ a single fixed test impedance as the impedance 256 which may, for example, have a value of 20 ohms for 115 volt circuits as explained in connection with the description of Figure 1. The scale 270 is preferably arbitrarily calibrated to indicate directly the "Q" or quality factor of the supply circuit as explained in connection with the scale 70 in the description of Figure 1.

While the form of embodiment of the invention as herein disclosed, constitutes a preferred form, it is to be understood that other forms might be adopted, as may come within the scope of the claims which follow.

What is claimed is as follows:

1. Apparatus for testing the characteristics of an electrical alternating current power supply including supply connecting means for connecting to the power supply, a transformer having its primary connections connected across the supply connecting means, an adjustable potentiometer having two terminals of its resistance element connected to the transformer secondary connections, said potentiometer having a movable tap, a potential indicator having two terminals, an impedance for imposing a test load upon the power supply, circuit and switching means having one switching arrangement for connecting the terminals of the potential indicator across the supply connecting means for a no load reading, said circuit switching means having another switching arrangement for connecting the impedance across the supply connecting means and for connecting the potential indicator and the tap and one of the terminals of said potentiometer in series across the supply connecting means, the connection of said tap and one of the terminals of said potentiometer with said potential indicator and the supply connecting means being arranged so that it adds to the potential across the supply connecting means.

2. Apparatus for testing the characteristics of an electrical alternating current power supply including supply connecting means for connecting to the power supply, a transformer having its primary connections connected across the supply connecting means, an adjustable potentiometer having its resistance element connected at opposite ends to the transformer secondary connections, said potentiometer having a movable tap and a scale to indicate the position of the tap, a voltmeter having two terminals, an impedance for imposing a test load upon the power supply, switching means having one switching arrangement for connecting the voltmeter across the supply connecting means for a no load reading, said switching means having another switching arrangement for connecting said impedance across the supply connecting means and for connecting one terminal of said voltmeter to said tap and the other voltmeter terminal to one terminal of said supply connecting means, and means connecting that end of said resistance element to the other terminal of the supply connecting means which will cause the potential impressed upon the potentiometer to add to the potential of the power supply.

3. Apparatus for testing the characteristics of an electrical alternating current power supply including supply connecting means for connecting to the power supply, an adjustable voltage boosting means having two fixed supply terminals connected to opposite sides of the supply connecting means and an adjustable terminal providing an adjustable boosted voltage, said voltage boosting means including circuit means extending between one of its fixed terminals and the adjustable terminal, a potential indicator having two terminals, an impedance for imposing a test load upon the power supply, switching means having one switching arrangement for connecting the terminals of the potential indicator across the opposite sides of the supply connecting means for a no load reading, said switching means having another switching arrangement for connecting the impedance across the opposite sides of the supply connecting means and for connecting one of the terminals of said potential indicator to the adjustable terminal of the voltage boosting means and the second terminal of said potential indicator to one of the sides of the supply connecting means.

4. Apparatus for testing the characteristics of an electrical alternating current power supply including supply connecting means for connecting to the power supply, an adjustable voltage boosting means including a transformer having one of its primary connections and one of its secondary connections connected to one side of the supply connecting means and the other of its primary connections connected to the other side of the supply connecting means, said transformer also having another secondary connection, said voltage boosting means also including an adjustable potentiometer having its two fixed terminals connected to the two transformer secondary connections, said potentiometer having a movable tap and a measuring device for indicating the position of the tap, a potential indicator having two terminals, an impedance for imposing a test load upon the power supply, switching means having one switching arrangement for connecting the terminals of the potential indicator across the opposite sides of the supply connecting means for a no load reading, said switching means having another switching arrangement for connecting the impedance across the opposite sides of the supply connecting means and for connecting one of the terminals of said potential indicator to the tap of said potentiometer, the second terminal of said potential indicator being connected to said other side of the supply connecting means.

5. Apparatus for testing the characteristics of an electrical power supply including supply connecting means having two separate conductors for connecting to two conductors of the power supply, an impedance, a potential indicator, a voltage boosting means having two fixed terminals and an adjustable terminal providing an adjustable boosted voltage, circuit and switching means having one arrangement for connecting said impedance and the two fixed terminals of said voltage boosting means in parallel electrical circuit relationship across the two separate conductors with the potential indicator being connected between the adjustable terminal and one of the separate conductors, said circuit and switching means having another arrangement for effectively deenergizing the impedance and for effectively connecting the potential indicator to the separate conductors in such a way as to indicate substantially the voltage without load.

6. Apparatus for testing the characteristics of an electrical power supply including supply connecting means having two separate conductors for connecting to two conductors of the power supply, an impedance, a potential indicator, a voltage boosting means having two fixed terminals and an adjustable terminal providing an adjustable boosted voltage, circuit and switching means having one arrangement for connecting said impedance and the two fixed terminals of said voltage boosting means in parallel electrical circuit relationship across the two separate conductors with the potential indicator being connected between the adjustable terminal and one of the separate conductors, said circuit and switching means having another arrangement for effectively deenergizing the impedance and for effectively connecting the potential indicator to the separate conductors in such a way as to indicate substantially the voltage without load, and a scale cooperating with said adjustable terminal to indicate the quality of the supply connection when the tap is adjusted to make the potential indicator indicate the same voltage under each of the above arrangements.

7. Apparatus for testing the characteristics of an electrical power supply including supply connecting means for connecting to the power supply, a test load having one terminal connected to one terminal of the supply connecting means, an adjustable potential boosting means having three terminals, a potential indicator having one terminal connected to a second terminal of the supply connecting means, means electrically connecting one of the terminals of the potential boosting means to said one terminal of the supply connecting means, means electrically connecting the second terminal of the potential indicator to a second terminal of the potential boosting means, means electrically connecting the third terminal of the potential boosting means to the second terminal of the supply connecting means, and means electrically connecting the second terminal of the test load to the second terminal of the supply connecting means.

8. Apparatus for testing the characteristics of an electrical power supply including supply connecting means for connecting to the power supply, a test load having one terminal connected to one terminal of the supply connecting means, an adjustable potential boosting means having three terminals, a potential indicator having one terminal connected to a second terminal of the supply connecting means, means electrically connecting one of the terminals of the potential boosting means to said one terminal of the supply connecting means, means electrically connecting the second terminal of the potential indicator to a second terminal of the potential boosting means, means electrically connecting the third terminal of the potential boosting means to the second terminal of the supply connecting means, and means electrically connecting the second terminal of the test load to the second terminal of the supply connecting means, two of said electrical connecting means including switch means for disconnecting the electrical connection.

9. Apparatus for testing the characteristics of an electrical power supply including supply connecting means for connecting to the power supply, an adjustable potential boosting means having an adjustable terminal and two fixed terminals, a potential indicator having one terminal electrically connected to one side of the supply connecting means, a test load, electrical conductor and switch means having one arrangement for effectively electrically connecting the second terminal of said indicator to the adjustable terminal of said potential boosting means and for effectively electrically connecting the fixed terminals of the potential boosting means and the terminals of the test load across the two sides of the supply connecting means, said electrical conductor and switch means having a second arrangement for effectively electrically disconnecting said indicator from the influence of the potential boosting means and the test load and for effectively connecting said indicator to indicate the voltage across the supply connecting means.

DONALD F. ALEXANDER.

REFERENCES CITED

The following references are of record in the file of this patent:

UNITED STATES PATENTS

| Number | Name | Date |
|---|---|---|
| 1,197,178 | Bliss | Sept. 5, 1916 |
| 2,186,727 | Martin et al. | Jan. 9, 1940 |
| 2,270,554 | Pugh | Jan. 20, 1942 |
| 2,295,578 | Heyer | Sept. 15, 1942 |
| 2,325,936 | Blume | Aug. 3, 1943 |